(12) United States Patent
Kim

(10) Patent No.: US 11,184,454 B1
(45) Date of Patent: Nov. 23, 2021

(54) SYSTEMS AND METHODS FOR MANAGING PERPETUAL DATA REQUESTS TO CONSERVE RESOURCES

(71) Applicant: COUPANG CORP., Seoul (KR)

(72) Inventor: Hyun Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/128,941

(22) Filed: Dec. 21, 2020

(51) Int. Cl.
| | |
|---|---|
| *G06F 15/16* | (2006.01) |
| *H04L 29/08* | (2006.01) |
| *G06Q 10/06* | (2012.01) |
| *H04L 29/06* | (2006.01) |

(52) U.S. Cl.
CPC ..... *H04L 67/2819* (2013.01); *G06Q 10/0637* (2013.01); *H04L 67/2828* (2013.01); *H04L 67/40* (2013.01)

(58) Field of Classification Search
CPC . H04L 67/2819; H04L 67/2828; H04L 67/40; G06Q 10/0637
USPC .......................... 709/202–203; 705/304, 340
See application file for complete search history.

(56) References Cited

U.S. PATENT DOCUMENTS

| | | | | |
|---|---|---|---|---|
| 6,785,893 | B2* | 8/2004 | Morris ................ | G06F 11/3409 710/260 |
| 9,825,956 | B2* | 11/2017 | Kelley ................... | H04L 67/10 |
| 9,900,264 | B1* | 2/2018 | Chen ....................... | H04L 29/06 |
| 10,375,054 | B2* | 8/2019 | Uppalapati ........... | H04L 67/306 |
| 10,795,992 | B2* | 10/2020 | Dykes .................. | G06F 21/552 |
| 10,915,900 | B1* | 2/2021 | Higgins ............... | G06Q 20/102 |
| 10,956,244 | B1* | 3/2021 | Cho ........................ | H04L 67/40 |
| 10,977,660 | B2* | 4/2021 | Thomas ............... | G06Q 20/405 |
| 2008/0141286 | A1* | 6/2008 | Marinescu ........... | G06F 21/566 719/328 |
| 2008/0147514 | A1* | 6/2008 | Shuster ............. | G06Q 30/0633 705/26.8 |
| 2012/0159570 | A1* | 6/2012 | Reierson ................ | G06F 21/74 726/2 |
| 2012/0246722 | A1 | 9/2012 | Boney | |
| 2014/0012693 | A1 | 1/2014 | Sundaresan et al. | |

(Continued)

OTHER PUBLICATIONS

International Search Report and Written Opinion mailed Sep. 15, 2021 by the Korean Patent Office in counterpart PCT Application No. PCT/IB2021/050046, 7 pages.

*Primary Examiner* — Bharat Barot
(74) *Attorney, Agent, or Firm* — Finnegan, Henderson, Farabow, Garrett & Dunner, LLP

(57) ABSTRACT

A computer-implemented system for eliminating perpetual application programming interface (API) calls to minimize resource drain. The system may comprise: at least one non-transitory computer-readable medium configured to store instructions; and at least one processor configured to execute the instructions to perform operations. The operations may comprise: monitoring a dynamic list of one or more API calls, wherein the dynamic list is configured to vary in length; identifying a subset of the API calls that remain in the dynamic list through a number of the process cycles over a first threshold; querying one or more network databases to verify that the subset of the API calls have not been resolved; determining costs of dismissing the subset of the API calls; dismissing the API calls with costs less than a second threshold; and transmitting a notification API call to one or more user devices corresponding to the dismissed API calls.

19 Claims, 13 Drawing Sheets

(56) References Cited

U.S. PATENT DOCUMENTS

| | | |
|---|---|---|
| 2014/0282626 A1 | 9/2014 | Muguda et al. |
| 2016/0379136 A1* | 12/2016 | Chen .................... G06F 21/552 706/12 |
| 2017/0193117 A1 | 7/2017 | Reigen et al. |
| 2018/0026943 A1 | 1/2018 | Call et al. |
| 2019/0349210 A1* | 11/2019 | Nayak ................ H04L 12/1407 |

* cited by examiner

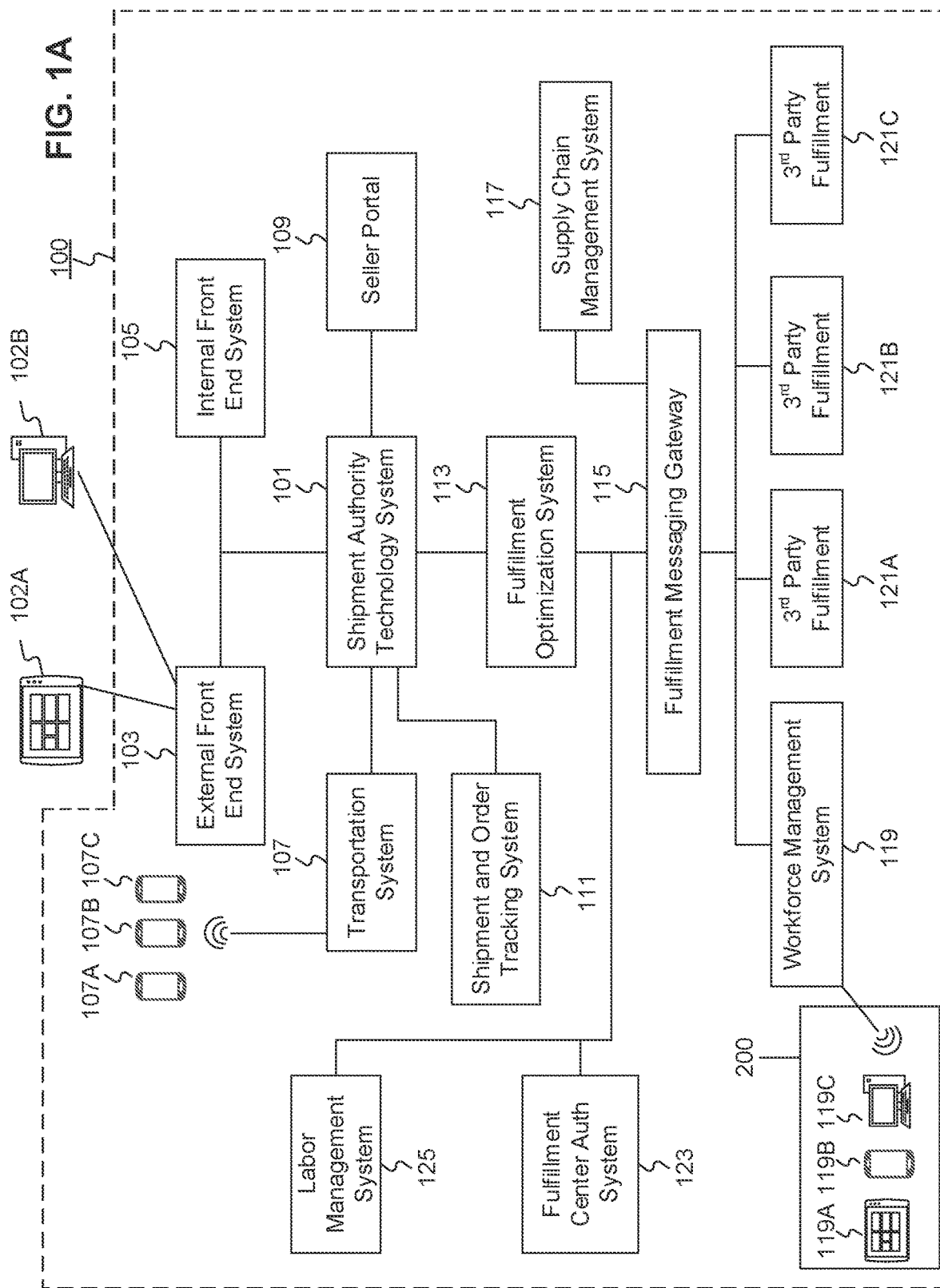

SYSTEMS AND METHODS FOR MANAGING PERPETUAL DATA REQUESTS TO CONSERVE RESOURCES

TECHNICAL FIELD

The present disclosure generally relates to computerized systems and methods for streamlining select processes to improve scalability. In particular, embodiments of the present disclosure relate to inventive and unconventional systems that identify a subset of electronic requests that can benefit from a more streamlined process, thus reducing network load and improving scalability.

BACKGROUND

Advances in computer networking have moved many different processes online, enabling fast, remote processing, and automation. In particular, increasing number of business processes that used to require human intervention are now conducted online to the point where hundreds of thousands or millions of transactions can take place daily within a company's network.

These transactions are typically implemented using Application Programming Interfaces (APIs) that enable communications between different systems, subsystems, and modules. Communications using APIs to process transactions, also known as API calls, are often small in size (e.g., less than a few hundred bytes) and do not exert a significant load on the networks. Advances in network communications that enable faster data transfer also ensure that the networks are capable of supporting large loads.

A problem arises, however, as more systems, subsystems, or modules are added to the network to specialize in certain tasks, and an increasing number of them gets involved to complete a transaction. For example, a simple request to return an item to an online shopping mall may involve API calls among: a system that received the return request; a system that managed the initial order; a system that processed the payment for the order; a system that manages return shipping; a system that receives and restocks the returned item; as well as the subsystems and modules that function in conjunction with the systems. The problem is exacerbated when the networks must support millions of users or transactions per day. Even small API calls around 100 bytes can quickly balloon and hog down a network.

To be sure, the advances in network communications facilitate working through the number of API calls that are generated to resolve each call. However, real-world applications and their associated processes (e.g., a request to retrieve an item from a shelf is tied to the physical retrieval of the item) are imperfect, and not all requests can be resolved on first attempt. Unresolved requests must remain in the system and repeatedly generate sets of API calls until they are resolved. Without regular monitoring, the unresolved requests can remain indefinitely until the associated processes are successfully completed. Furthermore, occasional hiccups can even cause resolved requests to linger in the system, letting them continue to generate API calls undetected.

If left to persist, these requests and the API calls that they generate may continue to place a load on the network and waste valuable resources. They may also result in loss of man-hours where the API calls are configured to trigger manual processes. Such perpetual requests contribute to excessive network load and decrease scalability of the network. Therefore, there is a need to monitor networks to identify and remove any perpetual requests that remain in the network past expected processing times.

SUMMARY

One aspect of the present disclosure is directed to a computer-implemented system for eliminating perpetual API calls to minimize resource drain. The system may comprise: at least one non-transitory computer-readable medium configured to store instructions; and at least one processor configured to execute the instructions to perform operations. The operations may comprise: monitoring a dynamic list of one or more API calls, wherein the dynamic list is configured to vary in length; identifying a subset of the API calls that remain in the dynamic list through a number of the process cycles over a first threshold; querying one or more network databases to verify that the subset of the API calls have not been resolved; determining costs of dismissing the subset of the API calls; dismissing the API calls with costs less than a second threshold; and transmitting a notification API call to one or more user devices corresponding to the dismissed API calls.

Another aspect of the present disclosure is directed to a computer-implemented method for eliminating perpetual API calls to minimize resource drain. The method may comprise: monitoring a dynamic list of one or more API calls, wherein the dynamic list is configured to vary in length; identifying a subset of the API calls that remain in the dynamic list through a number of the process cycles over a first threshold; querying one or more network databases to verify that the subset of the API calls have not been resolved; determining costs of dismissing the subset of the API calls; dismissing the API calls with costs less than a second threshold; and transmitting a notification API call to one or more user devices corresponding to the dismissed API calls.

Yet another aspect of the present disclosure is directed to a computer-implemented system for eliminating unresolved API calls. The system may comprise: at least one non-transitory computer-readable medium configured to store instructions; and at least one processor configured to execute the instructions to perform operations. The operations may comprise: receiving a first API call to retrieve one or more items; adding the first API call to a dynamic list of one or more API calls; repeatedly iterating through the dynamic list by initiating retrieval processes for retrieving the one or more items; receiving a plurality of indications that the retrieval process was unsuccessful; triggering a review API call when a number of the indications exceeds a threshold; and removing the first API call from the dynamic list in response to an outcome of the review API call.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for identifying a subset of electronic requests that can benefit from a more streamlined process, thus reducing load on the overall network and improving scalability. Compared to a traditional or an existing process, the streamlined process may be more advantageous in requiring less resources such as network load, computing power, and/or man-hour.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
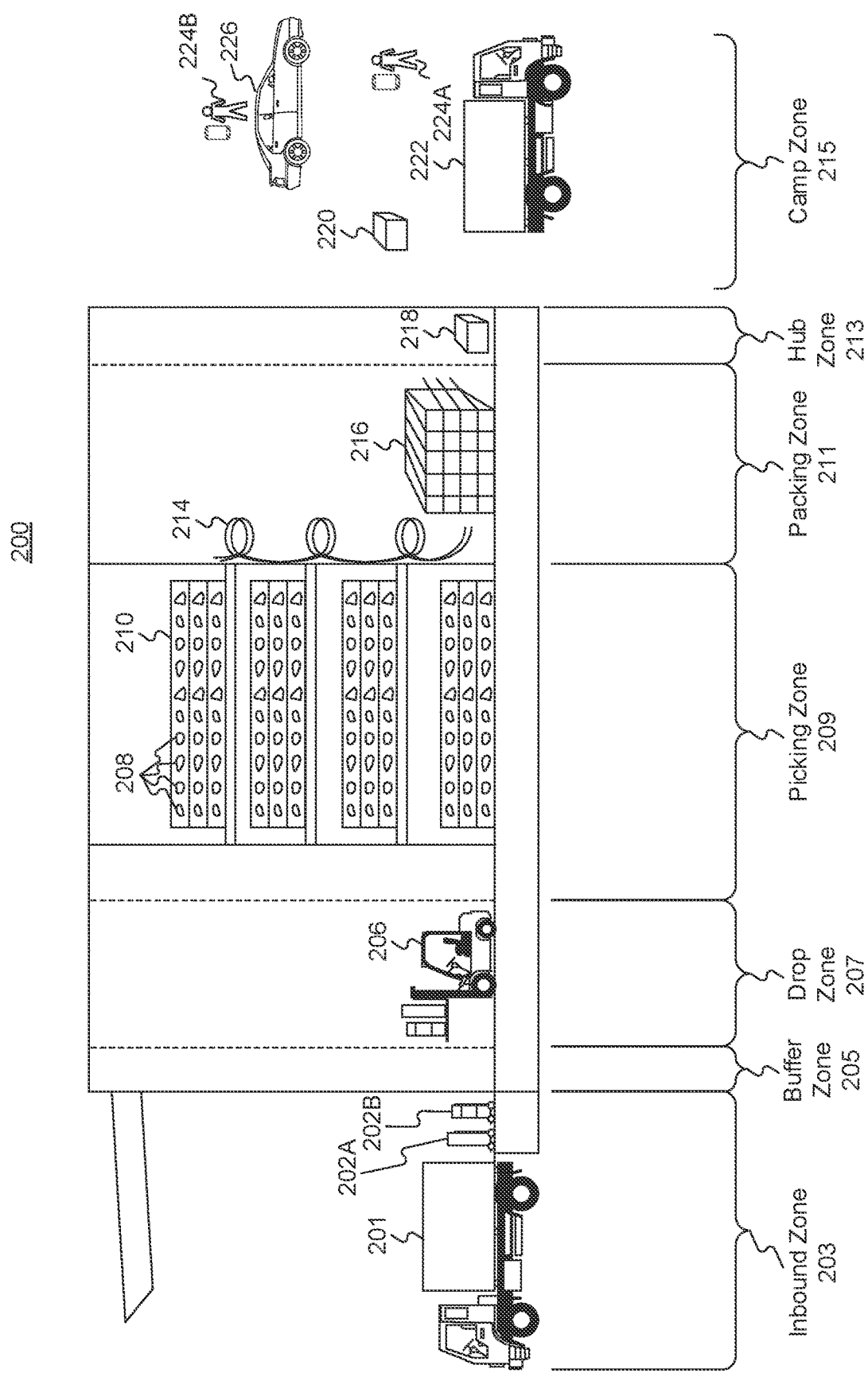
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
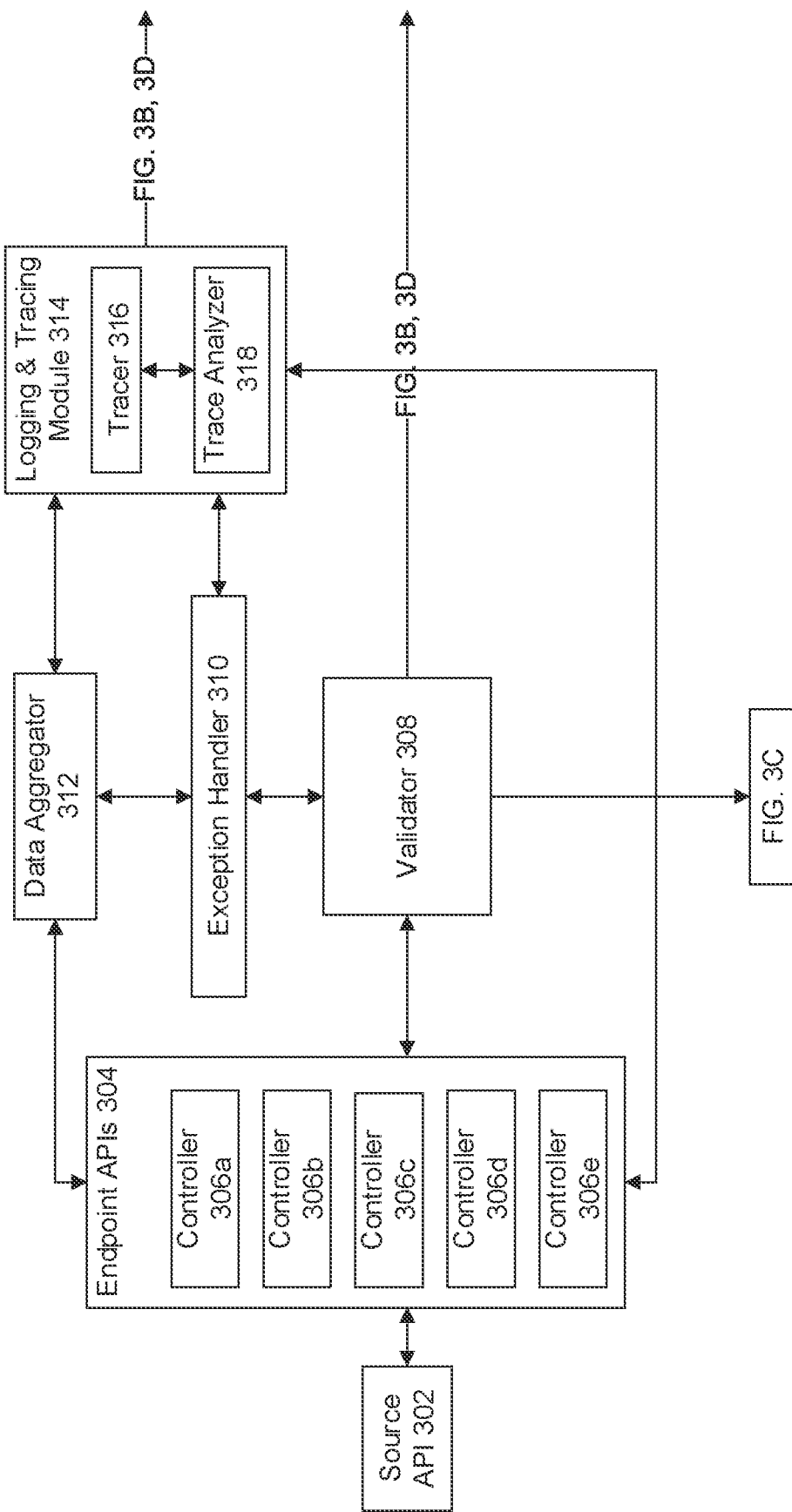
FIG. 3A illustrates an exemplary pictographic representation of an intake sub-system 300, consistent with the disclosed embodiments.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, IP address, MAC address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG. 3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

Figure 3B:
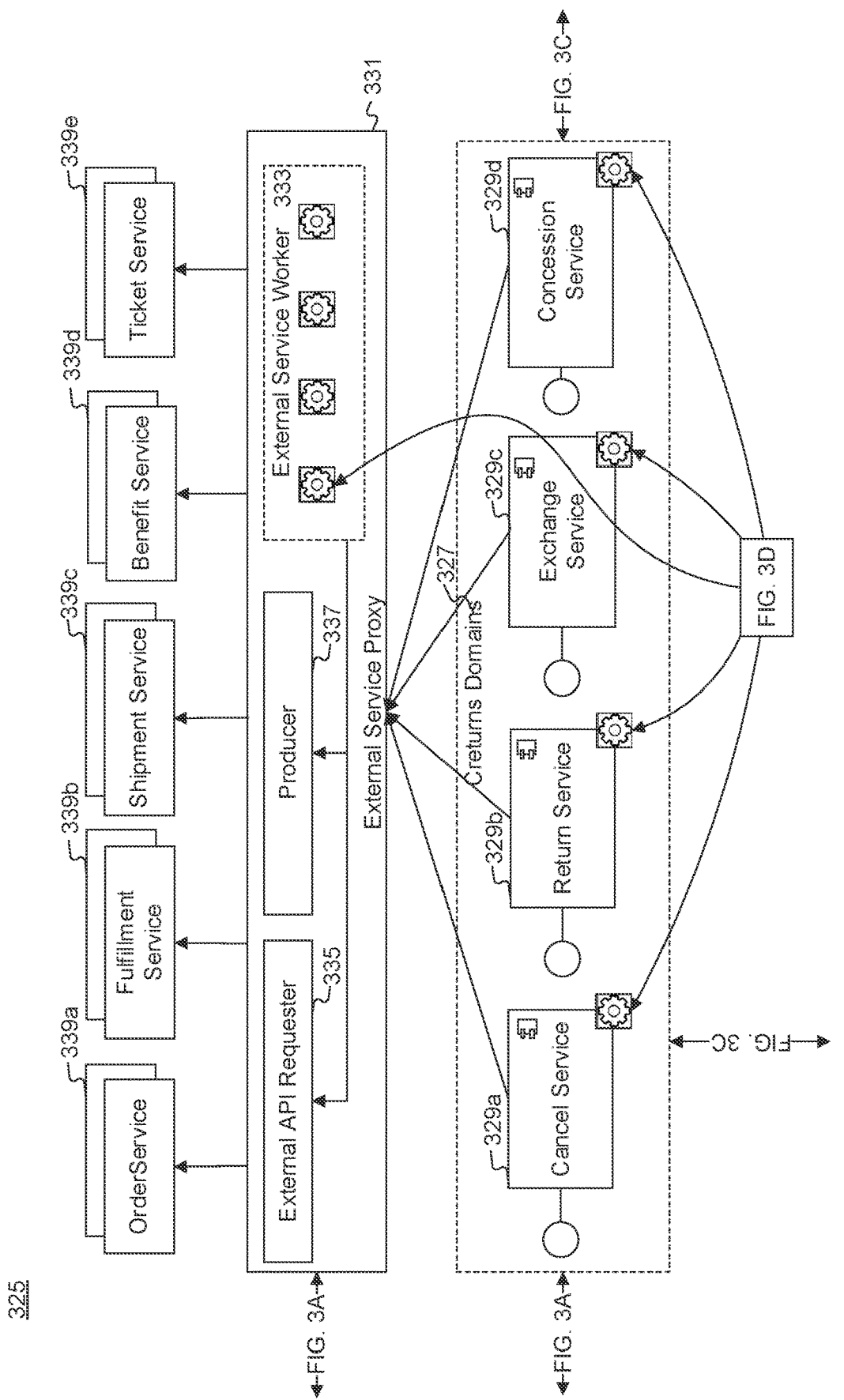
FIG. 3B illustrates an exemplary pictographic representation of an output sub-system 325, consistent with the disclosed embodiments.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339*a-e*. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
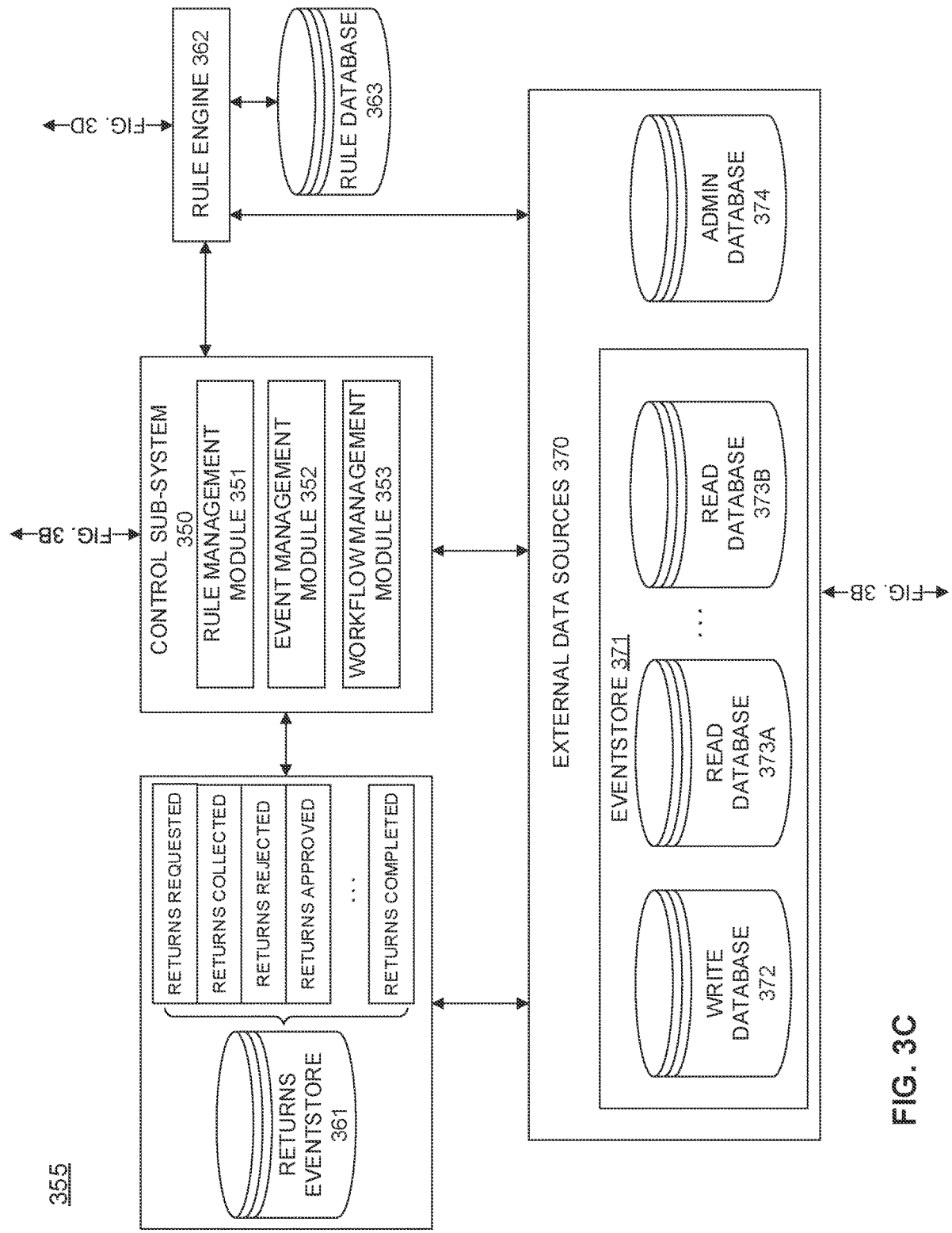
FIG. 3C illustrates an exemplary pictographic representation of a control sub-system, an exemplary returns event store, an exemplary rule engine, and exemplary external data sources, consistent with the disclosed embodiments.
Figure 3D:
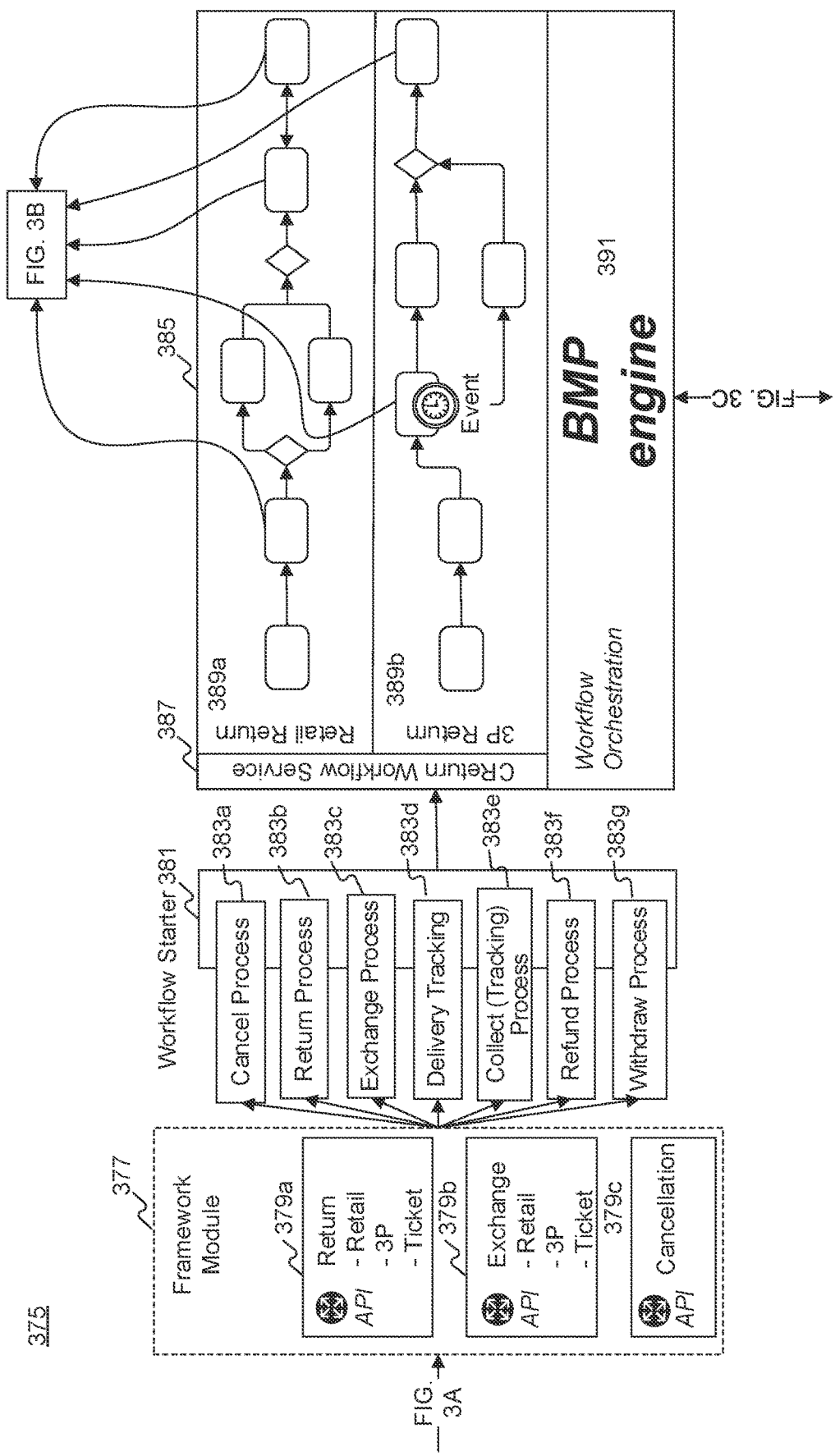
FIG. 3D illustrates an exemplary pictographic representation of a workflow sub-system 375, consistent with the disclosed embodiments.

Output sub-system 325 may include a number of Creturns Domains module 327, which may be communicably coupled to workflow sub-system 375 in FIG. 3D. In some embodiments, Creturns Domains module 327 may comprise a variety of services 329*a-d*. Examples of services as illustrated on FIG. 3B may include cancel service 329*a*, return service 329*b*, exchange service 329*c*, and/or concession service 329*d*. Each of the services 329*a-d* may be responsible for processing output from the respective workflow tasks in workflow sub-system 375 in FIG. 3D. For example, cancel process workflow 383*a* in FIG. 3D may pass an output to cancel service 329*a*, while return process workflow 383*b* in FIG. 3D may pass an output to return service 329*b*. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339*a-e*. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339*a-e*. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn workflow starter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339*a-e* is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339*a-e*. Information passed to logging & tracing module 314 is logged and processed as described earlier in in section with reference to FIG. 3A. External services 339*a-e* initiate actions based on the requests. Examples of services as illustrated on FIG. 3B may include order service 339*a*, fulfillment service 339*b*, shipment service 329*c*, benefit service 339*d* and/or ticket service 339*e*. Each of the services 329*a-d* may be responsible for initiation of specific actions. For example, in the event, workflow sub-system 375 in FIG. 3D passes an output for exchange service 329*c* processing, it may initiate a number of external services. Exchange of an item may involve an output to order service 339*a* to order (order instruction may include instruction to buy an item from a supplier, inform a picker to prepare the item, purchase the item online, go to a $3^{rd}$ party store and pick it up, or other instructions directed to acquiring an item) a new item, output to shipment service 339*c* to generate a return shipping label, and/or an output to fulfillment service 339*b* to process returned item. Architecture of output sub-system 325 may be modified to add additional external services as needed.

FIG. 3C illustrates a pictographic representation 355 of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by customers (e.g., rules for approving and rejecting a return by a customer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by customers. For example, rule management module 351 may be configured to create and/or modify a rule for declining a return request by a customer. By way of example, rule management module 351 may be configured to create and/or modify a rule for declining a return request by a customer based on various parameters, including, for example, the data relating to the customer's previous return(s), the monetary amount involved in the return request, the type of the goods to be returned, etc. For example, rule management module 351 may create a rule for declining a return request by a customer if the customer returned an empty (or partially empty) box for a return within a predetermined number of days in the past (e.g., 180 days), which may indicate the customer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a customer or the system and store the events into returns eventstore 361. By way of example, a customer may initiate a return of an order via a user device associated with the customer. Event management module 352 may create an event of receiving the return request and store the event in returns eventstore 361. In some embodiments, an event may include information relating to the return, the customer, and the order associated with the return. For example, event management module 352 may create a first event for a return requested by a customer, which may include the information of the return request, the time stamp of receiving the return request, the information relating to the customer, or the like, or a combination thereof. Event management module 352 may create a second event when one or more items subject to the return are received from the customer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™ Returns eventstore 361 may include NoSQL databases such as HBase, MongoDB™ or Cassandra™. Alternatively, database 320 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage cancel service 329a, return service 329b, exchange service 329c, and/or concession service 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, cancel service 329a, return service 329b, exchange service 329c, and/or concession service 329d. Creturns Domains module 327 may obtain one or more services from external data sources 370.

As another example, external data sources 370 may include an eventstore 371 configured to store data relating to events (e.g., return events). In some embodiments, eventstore 371 may include a write database 372 configured to write data in response to write commands. Eventstore may also include one or more read databases 373 (e.g., read database 373A, read database 373B, etc.) configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™. Eventstore 371 and/or admin database 374 may include NoSQL databases such as HBase, MongoDB™ or Cassandra™. Alternatively, database 320 may include relational databases such as Oracle, MySQL and Microsoft SQL Server. In some embodiments, event-store 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3D may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a workflow starter 381, which may be communicatively coupled to framework module 377. Workflow starter 381 may include a list of processes 383a-g, which may initiate workflows based on the input received from the framework module 377. Examples of processes as illustrated in FIG. 3D may include cancel process 383a (containing instructions for starting a workflow initiated by the cancelation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Furthermore, each of the programming modules 379a-c of framework module 377 may initiate a plurality of processes 383a-g. For example, cancelation module 379c may initiate delivery tracking process 383d to determine if the item that is being canceled was deliver or is still in possession of the delivery personnel. Same cancelation module 379c may also initiate refund process 383f for issuing a refund to the customer.

Various combinations may be programed and may be specifically configured for use by a consumer, a delivery-person, an administrator, and/or a seller. Workflow starter 381 may be implemented on a computing device having a processor, memory component, and/or communications component. In some embodiments, workflow starter 381 and/or components of workflow starter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to workflow starter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389a-b which may control workflows based on the input received from the workflow starter 381. Examples of processes as illustrated in FIG. 3D may include retail return sub-module 389a, which allows for design and/or control of the workflows for the return of retail items and third party return sub-module 389b, which allows for design and/or control of the workflows for the return of third party items. Architecture of Creturn workflow service module 387 may be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
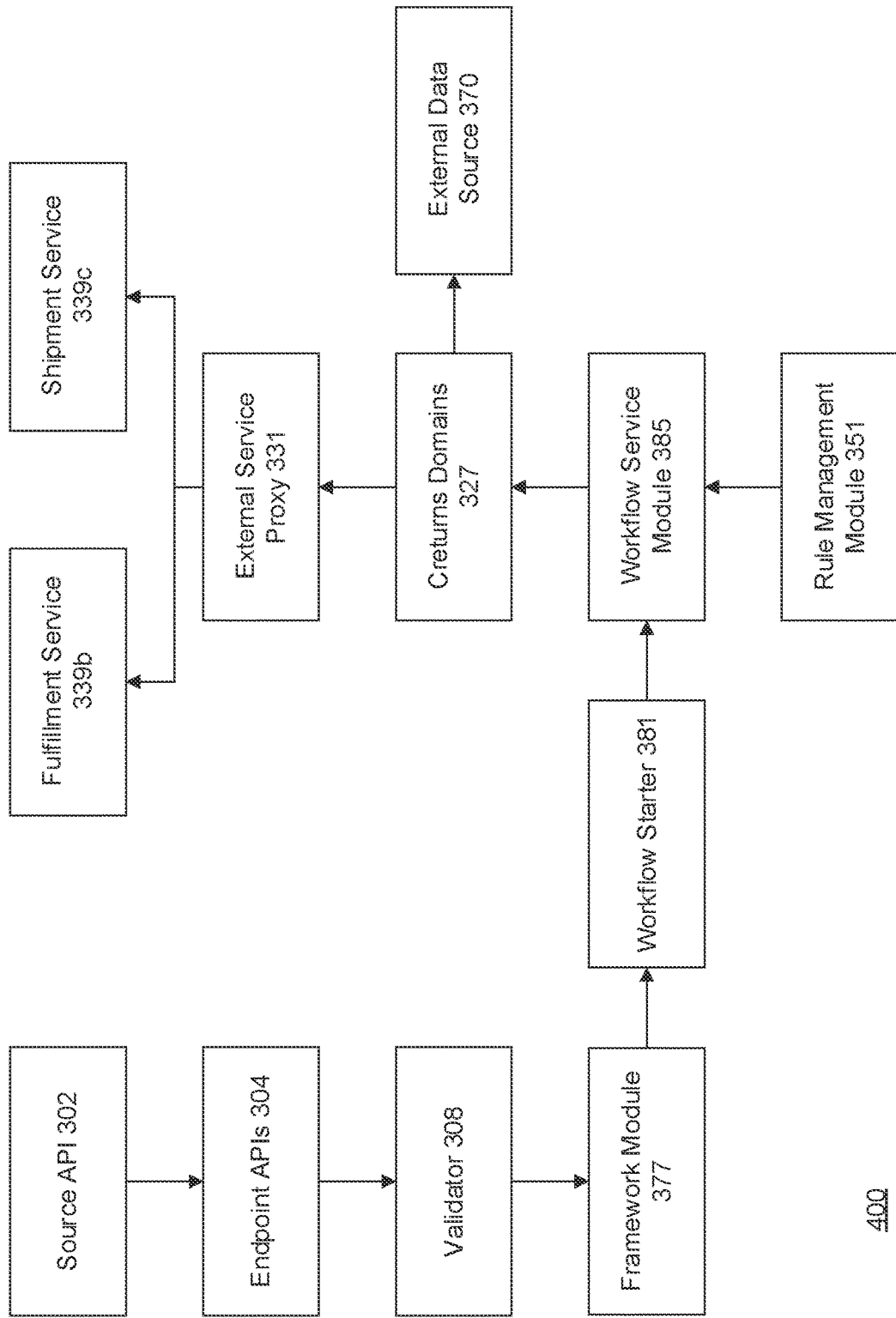
FIG. 4 illustrates an exemplary pictographic representation of a networked environment 400 for return processing that takes advantage of the currently disclosed embodiments.

FIG. 4 illustrates an exemplary pictographic representation of a networked environment 400 for return processing that takes advantage of the currently disclosed embodiments. While only a subset of the different systems, subsystems, and modules illustrated in FIGS. 3A-3D are illustrated in FIG. 4 for clarity and further explanation, other elements of FIGS. 3A-3D may be included in networked environment 400. Furthermore, the configurations and functionalities of the elements disclosed below may be combined with those of the corresponding elements in FIGS. 3A-3D in any In some embodiments, source API 302 may include any number of APIs that are configured to transmit electronic requests for a return. Each API in source API 302 may reside in a communication device such as a customer's mobile device 102A or an internal customer service system, which a worker may use to manually register a return request from a customer. Using these devices, for example, source API 302 may comprise a mobile application installed on a customer's mobile device transmitting an API call to endpoint APIs 304, a webpage accessed from a customer's computer transmitting a similar API call, an application operating from a customer service agent's computer manually entering a return request, or the like.

Endpoint APIs 304 may then receive the API calls from source API 302 and route them to appropriate systems, subsystems, and/or modules in networked environment 400. In some embodiments, endpoint APIs may use controllers 306a-e described above to further condition the received API calls and adopt the communication protocol of the network environment 400 (e.g., Java, HTML, CSS, or other programming languages).

One of the entities that receive the routed API calls, in some embodiments, may be validator 308. Validator 308 may be configured to check data included in the routed API calls in order to ensure, for example, that all required information is present and in compliance with respective data type and format.

In some embodiments, the validated API calls may be transferred to workflow service module 385 through, for example, framework module 377 and workflow starter 381. Workflow service module 385 may be configured to process the validated API calls based on different rules as initiated by the different processes (e.g., return process 383b or refund process 383f) in workflow starter 381, taking various actions appropriate for each request represented by the API calls.

Consistent with the embodiments disclosed herein, some of the rules may be devoted to identifying the return request calls eligible for the streamlined process. The identification may be based on a consideration of the data included in each API call as a whole, where the values of different parameters in the API call are analyzed in combination with each other. For example, workflow service module 385 may analyze one or more of a customer-specified code, the type of the item to be returned, the price of the item to be returned, the customer's past return history, the seller's location, or other aspects of the item for return and the corresponding order.

In some embodiments, the rules used by workflow service module 385 may be stored in rule management module 351. As disclosed above with respect to FIG. 3C, rule management module 351 may be configured to manage the rules for processing the returns as requested in each return request call. Rule management module 351 may utilize rule engine technology via rule engine 362, which may provide the ability to centrally store the rules (or corresponding business logic) in rule database 363, such as return eligibility criteria or streamlined process eligibility criteria. This allows the rules to be easily changed, for example, to quickly meet new customer demands, regulatory changes, and/or competition in the marketplace.

Once a return request call is processed by workflow service module 385 (e.g., determined whether to approve or deny the return request, or determined whether the return request is eligible for the streamlined process), workflow service module 385 may generate and transmit a series of additional API calls to signal other systems, subsystems, or modules to take appropriate actions. For example, when workflow service module 385 determines that a return request call is approved, workflow service module 385 may generate a call to external service proxy 331 via Creturns Domains module 327 to activate fulfillment service 339b and/or shipment service 339c. The processes that the approved return request calls go through is described below with respect to FIG. 5.

Figure 5:
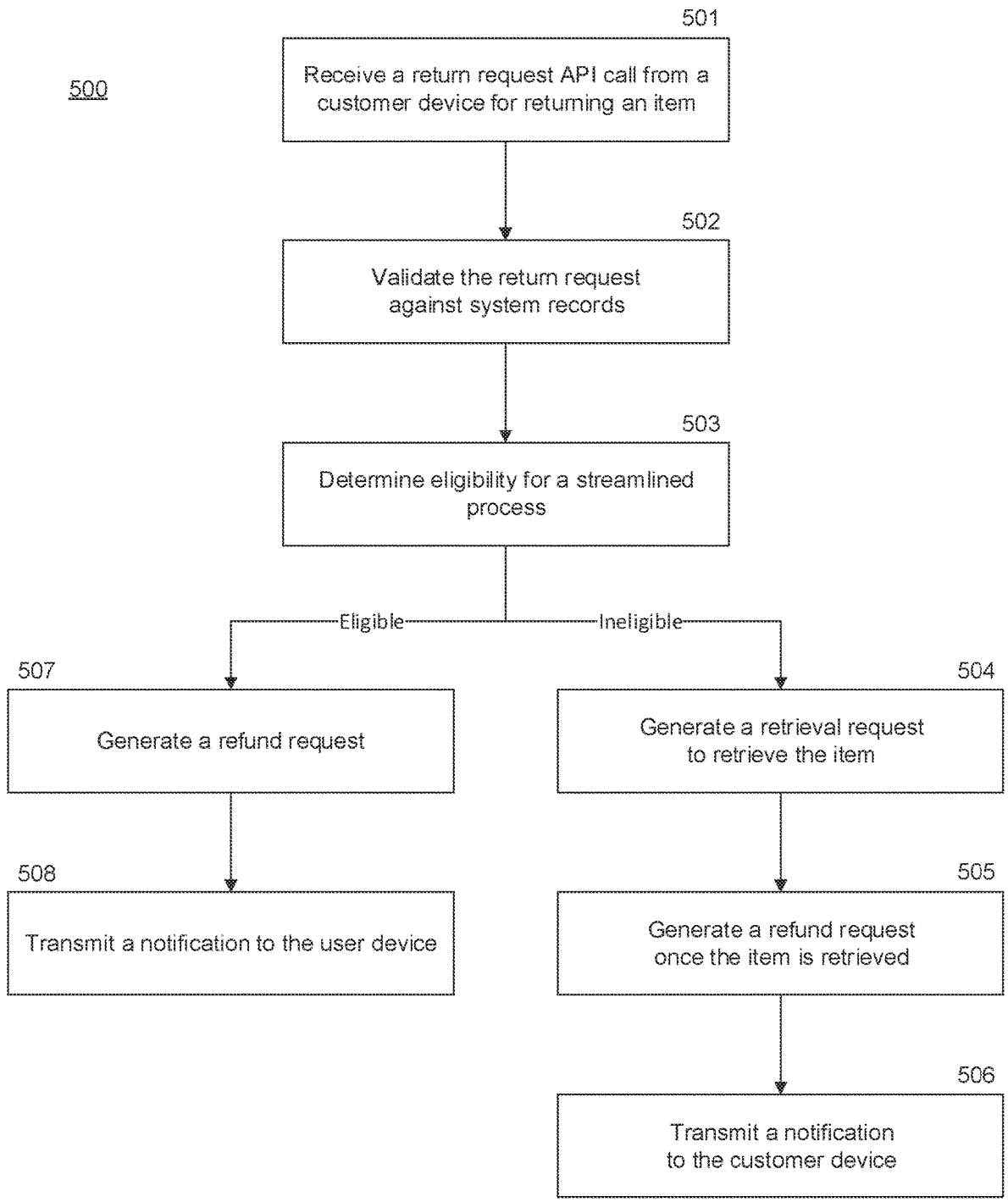
FIG. 5 illustrates an exemplary flowchart of a computerized process for processing a return, consistent with the disclosed embodiments.

FIG. 5 is a flowchart of an exemplary computerized process 500 for processing a return that takes advantage of the currently disclosed embodiments. While process 500 is described as applied to return processing, such use is only exemplary and process 500 can be modified to adapt other processes to reduce network load and improve scalability. Process 500 may be performed with any system, a network of systems, a server, or the like that is tasked with processing returns, such as the systems described above with respect to FIGS. 3A-3D and 4. Process 500 is described below with reference to the subsystems of FIGS. 3A-3D as well as networked environment 400 of FIG. 4, but any other configuration of systems, subsystems, or modules may be used to perform process 500.

Process 500 depicts two exemplary processes for reviewing and executing a return request—a regular process represented by steps 501-506 that improves the accuracy of managing the returns (e.g., receiving the request and receiving the returned item) and a streamlined process represented by steps 501-503, 507, and 508 that improves the speed of reviewing and executing the returns. In some embodiments, both processes of process 500 may be performed by the systems, subsystems, and modules depicted in FIGS. 3A-D, a subset of which are also depicted in FIG. 4. Variations of the two processes are also within the scope of the disclosed embodiments, and process 500 may include other processes for reviewing and executing a return request as well.

At step 501, the regular process may be initiated by receiving a return request from a customer device for returning an item. In some embodiments, the return request may be a return request call generated and transmitted by source API 302. As an example, the return request may be generated by a customer for returning one of the items of an order that he/she previously placed and received. In some embodiments, endpoint API 304 may route the return request calls to appropriate destinations as disclosed above.

At step 502, validator 308 may validate the return request calls against system records. For example, validator 308 may extract basic information from the return request call such as the customer information, the item identifier of the item to be returned, and the order identifier of the original order associated with the item, and look up the information in FO system 113 to verify that the customer is indeed the person that ordered the item and that the item is indeed the item included in the order in the correct quantity. In some embodiments, validator 308 may also use the extracted information to determine whether the item is eligible for a return. Such rules may be a part of the rules stored in rule management module 351 described above.

At step 503, workflow service module 385 may analyze the return request calls to determine their eligibility for the streamlined process. Step 503 is described below in more detail with respect to the streamlined process. In some embodiments where process 500 only comprises either the regular process or the streamlined process, step 503 may be omitted or replaced to perform another function. In further embodiments, step 503 may also include determining whether to approve the return request using various modules such as Creturn workflow service module 387, retail return sub-module 389a, third party return sub-module 389b, and workflow orchestration module 391 described above.

At step 504, workflow service module 385 may generate and transmit a series of API calls to other systems, subsystems, or modules such as Creturns domains 327, external service proxy 331, fulfillment service 339b, and shipment service 339c as described above. In some embodiments, workflow service module 385 may generate one or more API calls to request retrieval of the item to be returned, which may comprise, for example, generating a return shipping label or dispatching a courier to pick up the item from the customer. Additionally or alternatively, the one or more API calls may also cause an autonomous system such as an autonomous robot, vehicle, or drone to travel to the customer's address specified in the corresponding return request call and retrieve the item.

In further embodiments, step 504 may also include receiving and restocking the returned item at a fulfillment center, which may also be performed using an autonomous robot, vehicle, or the like. For example, step 504 may comprise capturing (e.g., using a camera, scanner, RFID sensor, etc.) an item identifier of the returned item upon arrival at the fulfillment center and updating the data records of external data source 370 to record the retrieval or the arrival of the item.

As described above with respect to FIG. 3B, retrieving and restocking the item may involve a complex network of modules that each communicate using API calls. For example, return service 329b may receive an output from workflow service module 385 that triggers a series of subsequent calls to downstream modules (e.g., elements in external service proxy 331 or services 339a-e), each of which is associated with physical movement of items from the customer's address to various locations within a fulfillment center (e.g., FC 200) as the items are retrieved and restocked.

At step 505, once the returned item is received at a fulfillment center (e.g., FC 200), output sub-system 325 may generate yet another set of API calls to request a refund for the price of the returned item. In some embodiments, workflow service module 385 may generate and transmit the set of API calls for refund to payment management systems (not depicted) for communication with financial institutions and an eventual release of payments. The API calls for refund may also prompt external data source 370 to update data records pertaining to the customer that requested the return.

Still further, at step 506, output sub-system 325 may generate and transmit a notification (e.g., text message, in-app push notification, email, etc.) to the customer device associated with the customer that requested the return. Such notification may be transmitted in response to a completion of the API calls for refund. In some embodiments, the customer device may be the device that initially transmitted the return request call at step 501 above. Additionally or alternatively, the customer device may be a different device authenticated using the customer's login credentials.

While the exchange of the API calls among a network of different systems, sub-systems, and modules may appear complex, such exchange may allow different functional units (i.e., sub-systems or modules) to specialize in specific tasks. This may improve efficiency and reduce the error rate compared to traditional processes of managing returns. In some embodiments, such compartmentalized handling of different tasks may enable a modular implementation of each sub-system or modules, which may also improve flexibility when any of the sub-systems or modules fail, allowing other parts of the network to function on their own.

On the other hand, the streamlined process may improve the speed of managing the returns by omitting a portion of the steps performed in the regular process such as retrieving and restocking the item for return. While the regular process may improve the efficiency and accuracy of managing the returns, each of the API calls exchanged between different sub-systems and modules in response to each return request call as described above exerts a load on the network of the systems, sub-systems, and modules. The load, however small they may be, can quickly amass to throttle or overwhelm the network as the number of return request calls increase.

For example, more than 10 API calls per return request may be made to shipment service 339c over the course of a day as the systems process and keep track of the return request calls. Each of the more than 10 API calls may also trigger a series of subsequent calls within other networked systems described above with respect to FIG. 1A (e.g., SAT system 101), thereby adding to the network load. All in all, step 504 may take up a majority of resources spent on processing a return through process 500.

The streamlined process eliminates the need for these API calls for a subset of the return request calls, thereby reducing the network load. While the savings realized by the streamlined process may be negligible with respect to individual return request calls, the savings realized among hundreds of thousands or millions of users and their requests may accumulate to a significant advantage that improves scalability of the network. In other words, the network resource reduction resulting from processing return request calls through the streamlined process may ensure low latency and optimal network utilization even as the number of users and their requests increase exponentially. These savings, in turn, may contribute to lower operating cost in terms of maintaining and operating the network.

Still further, the streamlined process may also reduce operating cost in terms of actual man hours and physical resources necessary for the regular process. For example, in a case where step 504 involves retrieving the returned item from the customer, a worker must be dispatched to the customer's address, obtain the returned item, and return. Multiple trips may also be necessary if the customer is not present and the worker must be dispatched again. In another example, there is also the cost of inspecting and restocking the returned item, which may further complicate the regular process if the returned item is damaged or must be disposed in accordance with environmental regulations. The streamlined process thus leads to both technical and business advantages over the regular process for the subset of return requests that are eligible.

Turning to the streamlined process represented by steps 501-503, 507, and 508, the process may share steps 501-503 with the regular process. In these embodiments, all return request calls may go through steps 501 and 502 before they are split into either the regular process described above or the streamlined process below.

At step 503, workflow service module 385 may analyze the return request call to determine eligibility for the streamlined process. The determination may be based on a set of rules stored in rule management module 351. In some embodiments, the rules may correspond to one or more different scenarios in which the return request calls fall. Exemplary scenarios are described below, and other scenarios or variations thereof are within the scope of the disclosed embodiments as well.

In some embodiments, one or more of the rules may determine the eligibility based on a customer-specified code for indicating a reason for requesting the return. The customer-specified code may be specified, for example, by a customer submitting a return request through a mobile application or a website and be contained in the corresponding return request call as a parameter. The customer-specified codes may include any set of predetermined alphanumeric string of text associated with different scenarios. Possible scenarios may comprise, for example, change of mind, incorrect item, damaged in transit, inconsistent with the item description, missing item, or the like.

In some embodiments, a customer-specified code associated with a missing item may be set to be eligible for the streamlined process, because the customer is physically unable to return the item if the item is missing in the first place. In some embodiments, workflow service module 385 may also compare the item identifier corresponding to the item to be returned to a list of items eligible for the streamlined process. Alternatively or additionally, other codes associated with different scenarios may also be set to be eligible for the streamlined process as determined by the desired business practice.

Still further, workflow service module 385 may look up a record associated with the customer that requested the return in order to verify whether the customer could have selected the reason code for the missing item with a fraudulent intent. Such determination may be performed by a fraud detection system (not depicted) that keeps a detailed log of each customer's purchase and return activity. The fraud detection system may then analyze the log with a machine learning algorithm to identify suspicious requests. For example, the log may track the kind of items that a customer bought, their price, the subset of the items that were returned, the returned items' price and condition, or any other information directly or indirectly contained in the customer's return requests.

At step 507, once workflow service module 385 determines that the return request call is eligible for the streamlined process, workflow service module 385 may proceed to requesting a refund as described above with respect to step 505. In contrast to step 505 where the refund request is in response to receiving the returned item, however, workflow service module 385 may generate the API calls for the refund request upon determination that the corresponding return request call is eligible for the streamlined process. Alternatively or additionally, workflow service module 385 may condition the refund request on the price of the item for return, where the items with prices lower than or equal to a threshold are refunded upon meeting the eligibility for the streamlined process. The other items with prices higher than the threshold may require further review by a manager or via other processes. In some embodiments, workflow service module 385 may also notify shipment service 339c to specify that no item will be returned and transmit a notification to the customer device as described above with respect to step 506.

Returning to step 503, another set of rules may determine the eligibility based on information contained in the return request call indicating that the customer has already shipped the item to the fulfillment center. The information may comprise, for example, one of the customer-specified code described above and/or a tracking number for the return shipping. In such cases, workflow service module 385 may determine that there is no need to generate a retrieval request as described above with respect to step 504 and determine that the corresponding return request call is eligible for the streamlined process. Workflow service module 385 may also generate and transmit an API call to update a record associated with the particular item to be returned by the customer to contain the information on the customer's own return shipping. In some embodiments, workflow service module 385 may proceed to generate a refund request and transmitting a notification to the customer device in the manner described above with respect to steps 507 and 508.

In further embodiments, yet another set of rules may determine the eligibility for the streamlined process based on the type of the item for return. The eligible types may include, for example, perishable items that will not arrive at the fulfillment center in resaleable conditions or those purchased from a foreign vendor, which may incur a relatively high return shipping cost. In some embodiments, workflow service module 385 may determine the item type by sending an electronic query to a connected database (e.g., external data sources 370) with an item identifier contained in the return request call and receiving a parameter for the item type.

Once workflow service module 385 determines that the type of the item for return matches one of the predetermined set of item types, workflow service module 385 may further determine that the corresponding return request call is eligible for the streamlined process. In some embodiments, this may be because the returned item will probably not be resaleable or profitable and there is no need to generate a retrieval request as described above with respect to step 504. In some embodiments, workflow service module 385 may proceed again to generating a refund request and transmitting a notification to the customer device in the manner described above with respect to steps 507 and 508.

In some embodiments, the records of the customers that requested the returns eligible for the streamlined may be updated to reflect that the customer qualified for a refund without returning the item. Such records may be used later by a fraud detection system (not depicted) to analyze and identify fraudulent return request calls that appear to be eligible for another refund without a return.

Figure 6:
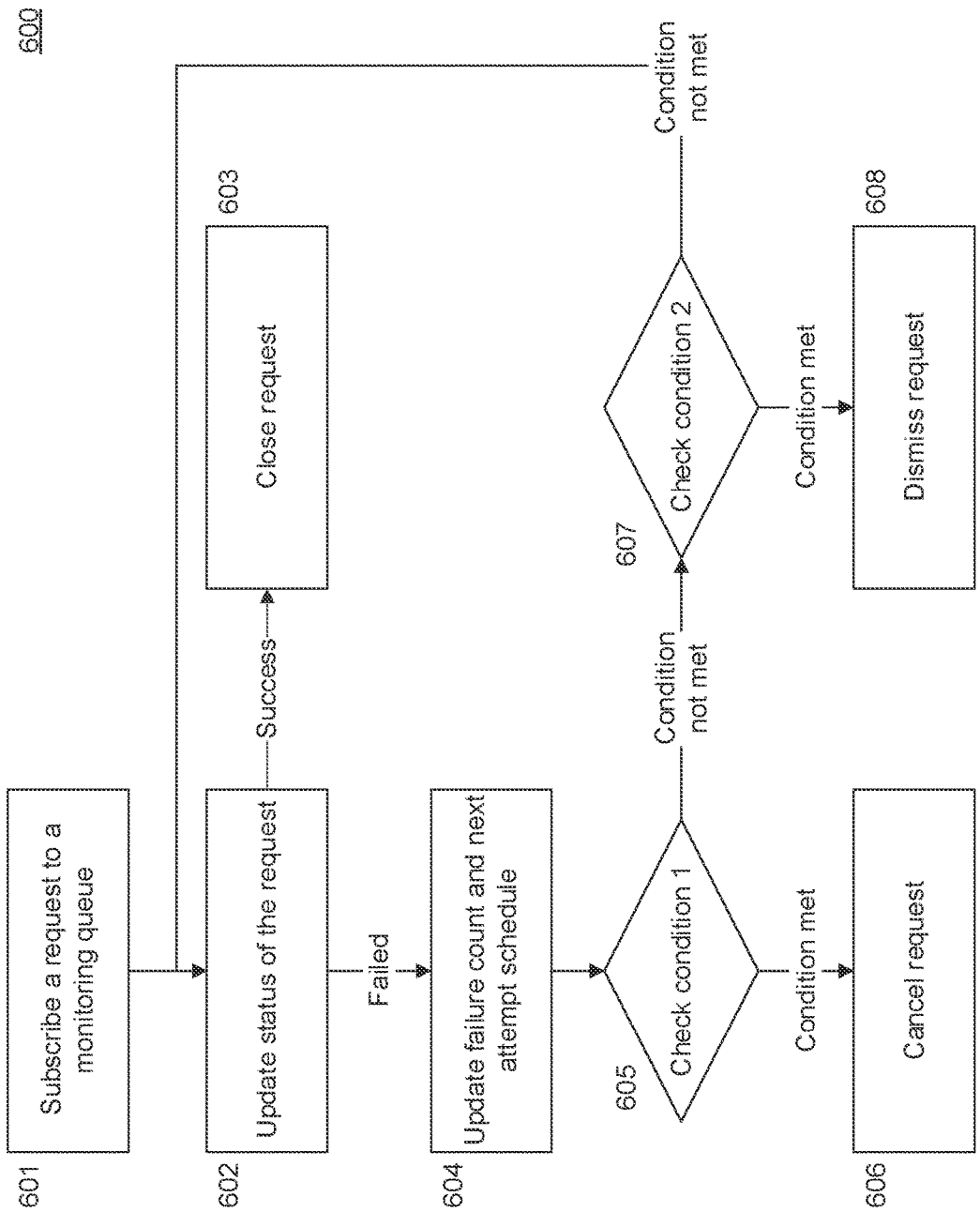
FIG. 6 illustrates an exemplary flowchart of a computerized process for identifying and eliminating unresolved return requests, consistent with the disclosed embodiments.

In addition to these improvements, network utilization can further be optimized by monitoring for any return request calls that remain in the system after multiple attempts. To this end, FIG. 6 illustrates an exemplary flowchart of a computerized process 600 for identifying and eliminating unresolved return requests calls. While process 600 is described as applied to return processing, such use is only exemplary and process 600 can be modified to adapt other processes to reduce network load and improve scalability. Process 600 may be performed with any system, a network of systems, a server, or the like that is tasked with processing returns, such as the systems described above with respect to FIGS. 3A-3D and 4. Process 600 is described below with reference to the subsystems of FIGS. 3A-3D as well as networked environment 400 of FIG. 4, but any other configuration of systems, subsystems, or modules may be used to perform process 600.

At step 601, workflow starter 381 may transfer the return request calls to event management module 352, which may in turn subscribe the return request calls to a monitoring queue in returns eventstore 361. The monitoring queue may be a dynamic list that grows and shrinks in length as different return request calls are added and resolved. The monitoring queue may be configured to track the outcome of each return request call as they are processed through various systems, subsystems, and modules described above, recording whether they are successfully completed (e.g., a return request call is eligible for the streamlined process and a refund is issued without retrieving the returned item; a return request call is ineligible, but the returned item is retrieved and the refund is issued) or failed (e.g., a return request call is ineligible for the streamlined process and must wait for the returned item to be retrieved; there was an error in processing a return request call).

At step 602, event management module 352 may iterate through the return request calls in the monitoring queue and update their statuses based on the outcome of various processes discussed above. For example, a particular return request call in the monitoring queue may be indicated as "returns requested," "returns retrieved," "returns rejected," "returns approved," "returns completed," or the like. The enumerated statuses are only exemplary and other statuses may be added or removed as appropriate. In some embodiments, event management module 352 may iterate through the monitoring queue periodically, repeating steps 602, 604, 605, and 607 in a process cycle for each return request call remaining the monitoring queue. The process cycle may occur once a day, once a week, once an hour, or at any predetermined interval as needed.

For the purposes of identifying and eliminating unresolved return requests, process 600 may divide the statuses into two groups, the first including those that are completed and no longer require any action, and the second including those that are pending and require one or more further actions. In some embodiments, whether a return request call is completed may depend on whether all associated API calls (e.g., refund requests or retrieval requests) are completed.

In some embodiments, event management module 352 may close the return request calls in the first group (i.e., successfully completed) and remove them from the monitoring queue. In some embodiments, closing a return request call may comprise updating its status in the monitoring queue as "return completed" and removing it from the monitoring queue. Event management module 352 may also log the closed return request calls in a separate database for record keeping purposes. The other return request calls in the second group, such as those that must wait for an associated refund request or retrieval request to be completed, may be left in the monitoring queue for further processing.

At step 604, event management module 352 may identify a subset of return request calls in the second group that are indicated as failed, which may indicate that they encountered a problem while going through the processes described above and must be tried again at a future timepoint. For example, a refund request may have been denied due to a payment error, or a retrieval request may have failed because the customer did not return the item in a prescribed window of time.

In some embodiments, event management module 352 may update failure count associated with each failed return request call and record when they will be attempted again. The update may include, for example, increasing the value of the failure count by one. In further embodiments, event management module 352 may also query one or more network databases to verify that the failed return request call has indeed failed (e.g., the associated retrieval request was unsuccessful and the item is not retrieved yet) before updating the failure count. Still further, event management module 352 may be configured to determine why each return request call failed based on logs or reports from the networked systems, subsystems and modules and update the failure count only when the failure was due to the customer's fault.

Recording the next attempt schedule may include specifying a particular time and date when the corresponding return request call will be reattempted. Additionally or alternatively, event management module 352 may specify a number of process cycles to pass before the corresponding return request call will be reattempted. In some embodiments, event management module 352 may not update the failure count unless the attempt schedule has passed.

At step 605, event management module 352 may check whether a return request call meets a first set of conditions that indicate that the return request call may be perpetual and should be removed from the monitoring queue in the interest of saving resources. In some embodiments, the first set of conditions may comprise having a failure count greater than or equal to a first threshold and not having refunded the purchase price to the customer. The first threshold may be 10, 5, 3, or any predetermined integer greater than zero. The first threshold may be adjustable via a user input and may reflect the number of attempts that networked environment 400 can support without being bogged down with an overflow of API calls.

At step 606, event management module 352 may cancel the return request call if it meets the first set of conditions and proceed to checking the condition for the next return request call in the monitoring queue. In some embodiments, cancelling a return request call may comprise updating its status in the monitoring queue as "return cancelled," removing the return request call from the monitoring queue, and sending a set of API calls to other networked systems to stop working on any associated API calls previously generated for the return request call. For example, event management module 352 may send an API call to SAT system 101 to stop trying to retrieve the corresponding item from the customer as instructed via a previously generated retrieval request.

In some embodiments, event management module 352 may also generate and transmit a notification API call to the corresponding customer device that the return request has been cancelled and that a refund will not be issued. The notification generated by the notification API call may comprise an in-app notification pushed to the customer device or other forms of electronic message such as an email or a text message as discussed above.

At step 607, event management module 352 may check whether the return request call meets a second set of conditions that indicate the return request call may be perpetual and should be removed from the monitoring queue also in the interest of saving resources. In some embodiments, the second set of conditions may comprise having a failure count greater than or equal to the first threshold and having an associated cost of dismissing less than a second threshold. The second threshold may be $10, $50, or any predetermined monetary amount greater than zero. The second threshold may be adjustable via a user input and may reflect the amount of money that can be forfeited in the interest of saving resources.

In some embodiments, the cost of dismissing the return request call may indicate the amount of loss that would occur if the corresponding return request call was approved and the purchase price refunded without retrieving the returned item like in the streamlined process discussed above. Event management module 352 may determine this cost by sending an API call to query a network repository (e.g., a repository that stores the purchase price and quantity of the returned item) for the price of the corresponding returned item.

At step 608, event management module 352 may dismiss the return request call if it meets the second set of conditions and proceed to checking the condition for the next return request call in the monitoring queue. In some embodiments, dismissing a return request call may comprise updating its status in the monitoring queue as "return approved" or "return dismissed," removing the return request call from the monitoring queue, and sending another set of API calls to other networked systems to stop working on any associated API calls previously generated for the return request call.

For example, event management module 352 may send an API call to SAT system 101 to stop trying to retrieve the corresponding item from the customer as instructed via a previously generated retrieval request. Event management module 352 may also send a refund request in a manner discussed above with respect to step 507, so that the refund may be issued and the return request resolved, allowing networked environment 400 to stop using additional resources to process the return request.

In some embodiments, event management module 352 may also generate and transmit a notification API call to the corresponding customer device that the return request has been approved and the refund will be issued. The notification generated by the notification API call may comprise an in-app notification pushed to the customer device or other forms of electronic message such as an email or a text message as discussed above.

After step 607 (or step 608 if the second set of conditions are satisfied), event management module 352 may proceed to the next return request call in the monitoring queue until it has iterated through all return request calls in the monitoring queue. This may conclude one process cycle, and the event management module 352 may pause until the next process cycle is set to begin at the prescribed window of time. In the meanwhile, event management module 352 or workflow service module 385 may generate and transmit additional API calls such as a refund request or a retrieval request to resolve remaining return request calls according to the attempt schedule recorded at step 604. Event management module 352 may also continue to perform step 601 and subscribe new return request calls from workflow starter 381 as they are received.

In some embodiments, event management module 352 may be configured to receive user input via internal front end system 105 to cancel, dismiss, or close a return request call manually. Such manual manipulation of return request calls may occur independently of the process cycles in response to one or more business needs such as a customer complaint or other rare cases that require a manual intervention.

In some embodiments, closing, cancelling, or dismissing a return request call (whether through process 600 or through a manual intervention discussed above) may cause a corresponding update API call to be transmitted to other networked databases so that internal users such as administrators and delivery workers have real-time or near real-time access to the status of each return request call. For example, if a delivery worker were heading to a customer's address to retrieve a returned item when the corresponding return request call is closed, cancelled, or dismissed, the delivery worker may receive a notification on his/her mobile device (e.g., 107A) that he/she no longer needs to retrieve the item from the customer. This may lead to further savings in resources (e.g., man-hour) by preventing the delivery worker from having to visit the customer's address.

As noted above, while process 600 is described as applied to return processing, such use is only exemplary and process 600 can be modified to adapt other processes to reduce network load and improve scalability. At a high level, for example, process 600 may comprise subscribing any given type of request to a monitoring queue; periodically iterating through the requests in the monitoring queue to resolve the requests; keeping track of the number of process cycles each request has gone through without being closed; and cancelling or dismissing the requests based on one or more sets of conditions. The conditions may be based on various factors such as the number of process cycles, the cost of dismissing or canceling the request, the load that the request places on the network or other resources during each process cycle, or the like.

In another example, process 600 can be modified to focus on a smaller pool of requests, like monitoring retrieval requests only. In this example, the monitoring queue may be configured to subscribe new retrieval requests as they are generated at step 504 above.

Here, the status of each retrieval request may be dependent on delivery workers' activities. Event management module 352 may update the status of each retrieval request based on reports or logs transmitted by mobile devices 107A-C, indicating whether the delivery worker was successful or unsuccessful in retrieving the item. Event management module 352 may update the failure count in response to a failed retrieval attempt and close the retrieval request in response to a successful retrieval. In further embodiments, event management module 352 may analyze the reports or logs from mobile devices 107A-C to determine why the retrieval process failed, and update the failure count only if the failure was due to the customer's fault.

In some embodiments, event management module 352 may even trigger workflow service module 385 to initiate the actual retrieval processes (e.g., dispatching a delivery worker to retrieve the item) as it iterates through the monitoring queue. In such embodiments, updating the next attempt schedule may comprise setting up the next time a delivery worker will be dispatched. Event management module 352 may also communicate new attempt schedule with the corresponding customer through a notification API call that displays the new attempt schedule on the customer's device.

Furthermore, event management module 352 may generate a review API call when the failure count exceeds a threshold as discussed above. The review API call may trigger checking various predetermined conditions for determining whether the corresponding retrieval request should be cancelled or dismissed.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for eliminating perpetual application programming interface (API) calls to minimize resource drain, the system comprising:
    at least one non-transitory computer-readable medium configured to store instructions; and
    at least one processor configured to execute the instructions to perform operations comprising:
        monitoring a dynamic list of one or more API calls, wherein the dynamic list is configured to vary in length;
        iterating through the API calls in the dynamic list in two or more process cycles, wherein a subset of the API calls that remain in the dynamic list through a number of process cycles over a first threshold are identified;
        querying one or more network databases to verify that the subset of the API calls have not been resolved;
        determining costs of dismissing the subset of the API calls;
        dismissing the API calls with the determined costs less than a second threshold; and
        transmitting a notification API call to one or more user devices corresponding to the dismissed API calls.

2. The computer-implemented system of claim 1, wherein the one or more API calls are associated with a request to return one or more items.

3. The computer-implemented system of claim 2, wherein determining the costs of dismissing the subset of the API calls comprises querying a network repository for the prices of the one or more items.

4. The computer-implemented system of claim 2, wherein the operations further comprise:
    resolving the one or more API calls by generating one or more retrieval API calls for retrieving the one or more items.

5. The computer-implemented system of claim 4, wherein the one or more API calls are removed from the dynamic list when the one or more retrieval API calls are completed.

6. The computer-implemented system of claim 2, wherein querying the network databases comprises verifying that the items associated with the subset of the API calls are not returned.

7. The computer-implemented system of claim 1, wherein the one or more API calls are resolved when one or more tasks associated with the one or more API calls are completed.

8. The computer-implemented system of claim 1, wherein dismissing the API calls comprise removing the API calls from the dynamic list.

9. The computer-implemented system of claim 1, wherein the first threshold is a positive integer less than 10.

10. The computer-implemented system of claim 1, wherein the second threshold is a monetary amount.

11. A computer-implemented method for eliminating perpetual application programming interface (API) calls to minimize resource drain, the method comprising:
    monitoring a dynamic list of one or more API calls, wherein the dynamic list is configured to vary in length;
    iterating through the API calls in the dynamic list in two or more process cycles, wherein a subset of the API calls that remain in the dynamic list through a number of process cycles over a first threshold are identified;
    querying one or more network databases to verify that the subset of the API calls have not been resolved;
    determining costs of dismissing the subset of the API calls;
    dismissing the API calls with the determined costs less than a second threshold; and
    transmitting a notification API call to one or more user devices corresponding to the dismissed API calls.

12. The computer-implemented method of claim 11, wherein the one or more API calls are associated with a request to return one or more items.

13. The computer-implemented method of claim 12, wherein determining the costs of dismissing the subset of the API calls comprises querying a network repository for the prices of the one or more items.

14. The computer-implemented method of claim 12, further comprising:
    resolving the one or more API calls by generating one or more retrieval API calls for retrieving the one or more items.

15. The computer-implemented method of claim 14, wherein the one or more API calls are removed from the dynamic list when the one or more retrieval API calls are completed.

16. The computer-implemented method of claim 12, wherein querying the network databases comprises verifying that the items associated with the subset of the API calls are not returned.

17. The computer-implemented method of claim 11, wherein the one or more API calls are resolved when one or more tasks associated with the one or more API calls are completed.

18. The computer-implemented method of claim 11, wherein dismissing the API calls comprise removing the API calls from the dynamic list.

19. The computer-implemented method of claim 11, wherein the first threshold is a positive integer less than 10.

* * * * *